US006671729B1

United States Patent
Gordon et al.

(10) Patent No.: US 6,671,729 B1
(45) Date of Patent: Dec. 30, 2003

(54) AUTONOMOUSLY ESTABLISHED SECURE AND PERSISTENT INTERNET CONNECTION AND AUTONOMOUSLY REESTABLISHED WITHOUT USER INTERVENTION THAT CONNECTION IF IT LOST

(75) Inventors: Barry Gordon, Eagleville, PA (US); Keith Andrew Baranoff, Huntington Valley, PA (US); Keith Davies, Ashburn, VA (US); Robin L. Hollows, Atlanta, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 735 days.

(21) Appl. No.: 09/594,857

(22) Filed: Jun. 15, 2000

Related U.S. Application Data
(60) Provisional application No. 60/196,814, filed on Apr. 13, 2000.

(51) Int. Cl.[7] .............................................. G06F 15/16
(52) U.S. Cl. ...................................... 709/227; 709/203
(58) Field of Search .................................. 709/227, 203

(56) References Cited

U.S. PATENT DOCUMENTS

| 5,838,682 A | * 11/1998 | Dekelbaum et al. ........ 370/401 |
| 5,995,606 A | * 11/1999 | Civanlar et al. ....... 379/207.13 |
| 6,298,120 B1 | * 10/2001 | Civanlar et al. ......... 379/88.17 |
| 6,317,597 B1 | * 11/2001 | Baker et al. ............. 455/426.1 |
| 6,460,083 B1 | * 10/2002 | Niwa et al. ................. 709/227 |

* cited by examiner

Primary Examiner—Krisna Lim
(74) Attorney, Agent, or Firm—Duane Morris LLP

(57) ABSTRACT

A communications system autonomously establishes, monitors, and maintains a secure and persistent internet "tunnel" communication path between one or more interconnected computers located at a "central" site and at least one host computer of a plurality of host computers at sites remote from the first site. The system includes a tunnel terminator server at the central site, following a secure tunneling protocol. The tunnel terminator server includes a public port interface coupled to the internet. The tunnel terminator initially establishes a clear communications link clients calling from the internet, and initially identifies and authenticates each of the clients as being "authorized." For each client so identified and authenticated, the tunnel terminator establishes an encrypted communications link, and provides a new private IP address to each individual client by the link. Each host computer (a) upon completion of boot-up, autonomously causes the associated modem to dial an ISP at a designated telephone numbers, to thereby initiate an ISP internet connection;

(b) upon establishment of the ISP connection, autonomously invokes, and interacts therewith to establish a secure communications "tunnel" link between the host computer and the tunnel terminator; and (c) upon establishing the secure communications link, autonomously monitors the state of both the ISP connection and the tunnel, and, if one of the ISP connection and the tunnel is lost, autonomously reestablishes the ISP connection and the tunnel, so that the ISP internet connection and the secure communications link are persistent.

3 Claims, 4 Drawing Sheets

Basic VPN Layout

AUTONOMOUSLY ESTABLISHED SECURE AND PERSISTENT INTERNET CONNECTION AND AUTONOMOUSLY REESTABLISHED WITHOUT USER INTERVENTION THAT CONNECTION IF IT LOST

This patent application claims priorty of provisional patent application Ser. no. 60/196,814 filed Apr. 13, 2000.

FIELD OF THE INVENTION

This invention relates to communications, and more particularly to virtual private networks implemented over the internet.

BACKGROUND OF THE INVENTION

In retail sales by vendors having many "bricks-and-mortar" retail outlets, it is desirable to centrally manage the inventory and point-of-sale information. In this context, point-of-sale information may include credit card numbers, customer identification, and the like. It would also be advantageous to the vendor if the retail outlets could know the inventory of other retail outlets in the same general area, so that an out-of-stock item at one retail outlet could be procured from a nearby retail outlet having it in stock.

A currently used approach to providing such information is a dedicated point-to-point communication link, such as a dedicated leased communications path between each retail outlet and the vendor's central or main location. Such dedicated connections are very expensive, and another expense is that of the hardware at the central location required to terminate each of N dedicated communications paths.

One approach to solving the expense problem associated with dedicated communication paths is to use the internet to provide communications. However, the internet is not secure, and it is possible for unscrupulous persons to intercept the data. Since customer information is flowing over these paths, interception is undesirable.

Another possible solution is to scramble or encrypt all of the data passing over the internet between the many remote retail outlets and the vendor's central location. This is subject to multiple problems. A first problem is that the computational resources at the central site must be capable of encrypting and decrypting the messages for possibly tens of thousands of retail outlets, and this amount of computational power may be expensive and slow. This also leaves open the issue of authenticating each remote site. An additional problem is that the internet communications path between each of the remote retail outlets and the central location is susceptible to interruption. Each interruption requires an entirely new authentication procedure to reestablish communications. Such interruptions occur frequently enough so that an unreasonable amount of computational resources may be necessary to establish and maintain connection. Yet another problem is that on at least some of those occasions in which the connection is broken, the operator at the remote site may be unaware of the loss of connection. Someone at the central location must then communicate with the operator at the remote site, and request that the connection be reestablished. When the operator is also a retail manager or salesperson, they may not be immediately available.

A further solution is currently in use, and that solution is the application of virtual private networks (VPNs). Virtual private networks are essentially an encrypted or secure path extending over the internet between a site and a tunnel terminator server. In a communications system using a VPN, the vendor's central location has a tunnel terminator server which connects by way of a broadband communication path with the internet. The tunnel terminator server has an internet address. Each of the remote retail outlets has a host computer with a modem. In order to set up a communication path between each remote retail outlet and the vendors central location, an operator at each remote location initiates commands to cause the modem at that site to dial the local internet provider. In response, the modem dials the ISP, and the operator commands a connection, including a user name and password if necessary. The ISP responds, thereby providing a path from the remote retail outlet to the internet. The operator then invokes the VPN client software loaded onto his retail outlet computer. The VPN client software then interacts with the tunnel terminator server, to thereby establish a secure communications path using an encryption standard such as L2TP, PPTP, or IPSec. Nortel Networks, Cisco Systems, and Lucent Technologies, among others, provide software and hardware for such VPN communications.

Improved VPN communications are desired.

SUMMARY OF THE INVENTION

A system according to an aspect of the invention is for autonomously establishing, monitoring, and maintaining a secure and persistent internet communication path between one or more interconnected computers located at a first "central" site and at least one host computer of a plurality of host computers at sites remote from the first site. The system includes a tunnel terminator server at the central site, operating pursuant to a secure tunneling protocol. The tunnel terminator server includes a private port interface and a public port interface. The tunnel terminator initially establishes a clear communications link, by way of the public port interface, with one or more of a plurality of clients calling from the internet, and initially identifies and authenticates each of the clients as being one of the "authorized" computers at one of the remote sites. For each client so identified and authenticated, the tunnel terminator establishes an encrypted communications link, and, when the encrypted communication link is established, provides a new private IP address to each individual client so identified and authenticated. The system also includes a connection between the private port interface of the tunnel terminator and the one or more interconnected computers. Each host computer(s) at the remote site includes a modem coupled to a public switched telephone system or PSTN. Each host computer further includes (a) an arrangement for, upon completion of boot-up of the host computer, autonomously causing the associated modem to dial an internet service provider at one or more predetermined telephone numbers, to thereby initiate establishment of an ISP internet connection to the host computer;

(b) an arrangement for, upon successfully establishing the ISP internet connection to the host computer, autonomously invoking the tunnel terminator server to thereby begin a dialogue therewith by way of the internet, and for interacting with the tunnel terminator to establish a secure communications link between the host computer and the tunnel terminator; and (c) an arrangement for, upon establishing the secure communications link between the host computer and the tunnel terminator, autonomously monitoring the state of both the ISP internet connection and the secure communications link, and for, if one of the ISP internet connection and the secure communications link is lost, autonomously reestablishing the lost one of the ISP internet connection and the secure communications link, so that the ISP internet connection and the secure communications link are persistent.

This system thereby establishes and maintains a secure internet data path between the host computer and the tunnel terminator server without intervention by an operator.

A host computer according to another aspect of the invention includes a modem coupled to a public switched telephone system. The host computer is for use in a system for autonomously establishing, monitoring, and maintaining a secure and persistent internet communication path between one or more interconnected computers located at a first site and at least one host computer, out of a plurality of host computers, at sites remote from the first site. The system includes (a) a tunnel terminator server operating pursuant to a secure tunneling protocol. The tunnel terminator server includes a private port interface and a public port interface. The tunnel terminator server initially establishes a clear communications link, by way of the public port interface, with one or more of a plurality of clients calling from the internet, and initially identifies and authenticates each of the clients as being "authorized," or as being one of the computers at one of the remote sites. For each client so identified and authenticated, the tunnel terminator server establishes an encrypted communications link, and, when the encrypted communication link is established, provides a new private IP address to each individual client so identified and authenticated. The system also includes (b) a connection between the private port interface of the tunnel terminator and the one or more interconnected computers. Each of the host computers includes (i) an arrangement for, upon completion of boot-up of the host computer, autonomously causing the associated modem to dial an internet service provider at one or more predetermined telephone numbers, to thereby initiate establishment of an ISP internet connection to the host computer, (ii) an arrangement for, upon successfully establishing the ISP internet connection to the host computer, autonomously (a) invoking the tunnel terminator server, to thereby begin a dialogue therewith by way of the internet, and (b) for interacting with the tunnel terminator to establish a secure communications link between the host computer and the tunnel terminator, (iii) an arrangement for, upon establishing the secure communications link between the host computer and the tunnel terminator, (a) autonomously monitoring the state of both the ISP internet connection and the secure communications link, and (b), if one of the ISP internet connection and the secure communications link is lost, autonomously reestablishing the lost one of the ISP internet connection and the secure communications link, so that the ISP internet connection and the secure communications link are persistent.

According to a yet further aspect of the invention, a method is provided for autonomously establishing, monitoring, and maintaining a secure virtual private network tunnel between a first site and each of a plurality of host computers at sites remote from the first site, where each of the host computers includes a modem coupled to a public switched telephone system, in a system which includes a tunnel terminator server. The tunnel terminator server according to this aspect of the invention operates pursuant to a secure tunneling protocol. The tunnel terminator server includes a private port interface and a public port interface. The tunnel terminator server initially establishes a clear communications link, by way of the public port interface, with one or more of a plurality of clients calling from the internet, and initially identifies and authenticates each of the clients as being one of the computers at one of the remote sites. For each client so identified and authenticated, the tunnel terminator establishes an encrypted communications link, and, when the encrypted communication link is established, provides a new private IP address to each individual client so identified and authenticated. The system also includes a connection between the private port interface of the tunnel terminator and the one or more interconnected computers. The method comprises the steps, at each host computer, of booting the host computer. Upon completion of booting of the host computer, it autonomously (a) causes the associated modem to dial an internet service provider at one or more predetermined telephone numbers, and (b) initiates establishment of an ISP internet connection to the host computer. Upon successfully establishing the ISP internet connection, the host computer autonomously (a) invokes the tunnel terminator server to thereby begin a dialogue therewith by way of the internet, and (b) interacts with the tunnel terminator to establish a secure communications link between the host computer and the tunnel terminator. The method further includes the step of, upon establishing the secure communications link between the host computer and the tunnel terminator, autonomously monitoring, at the host computer, the state of both the ISP internet connection and the secure communications link. If the step of autonomously monitoring indicates that the ISP internet connection communications link is lost, the host computer autonomously reestablishing the ISP internet connection and the secure communications link, and if the secure communications link is lost, the host computer autonomously reestablishes the secure communications link. As a result, the ISP internet connection and the secure communications link are persistent.

DESCRIPTION OF THE INVENTION

The invention is based, in part, on the realization that a VPN network employing client-to-server tunnels such as those now in use requires significant manual intervention to set up and maintain the secure connections, because it is not persistent. In the context of a plurality of retail outlets, each of which has plural cash registers or checkout locations, each individual cash register or checkout location may include bar-code readers which produce inventory-related signals, together with order tracking, customer information, and the like. These signals are coupled to a local computer arrangement for updating the local inventory and other information. The local inventory and other information is desirably immediately available to the vendor's central location for monitoring purposes, and so that retail outlets near each other can check each other's inventory in order to satisfy customer demand.

Figure 1:
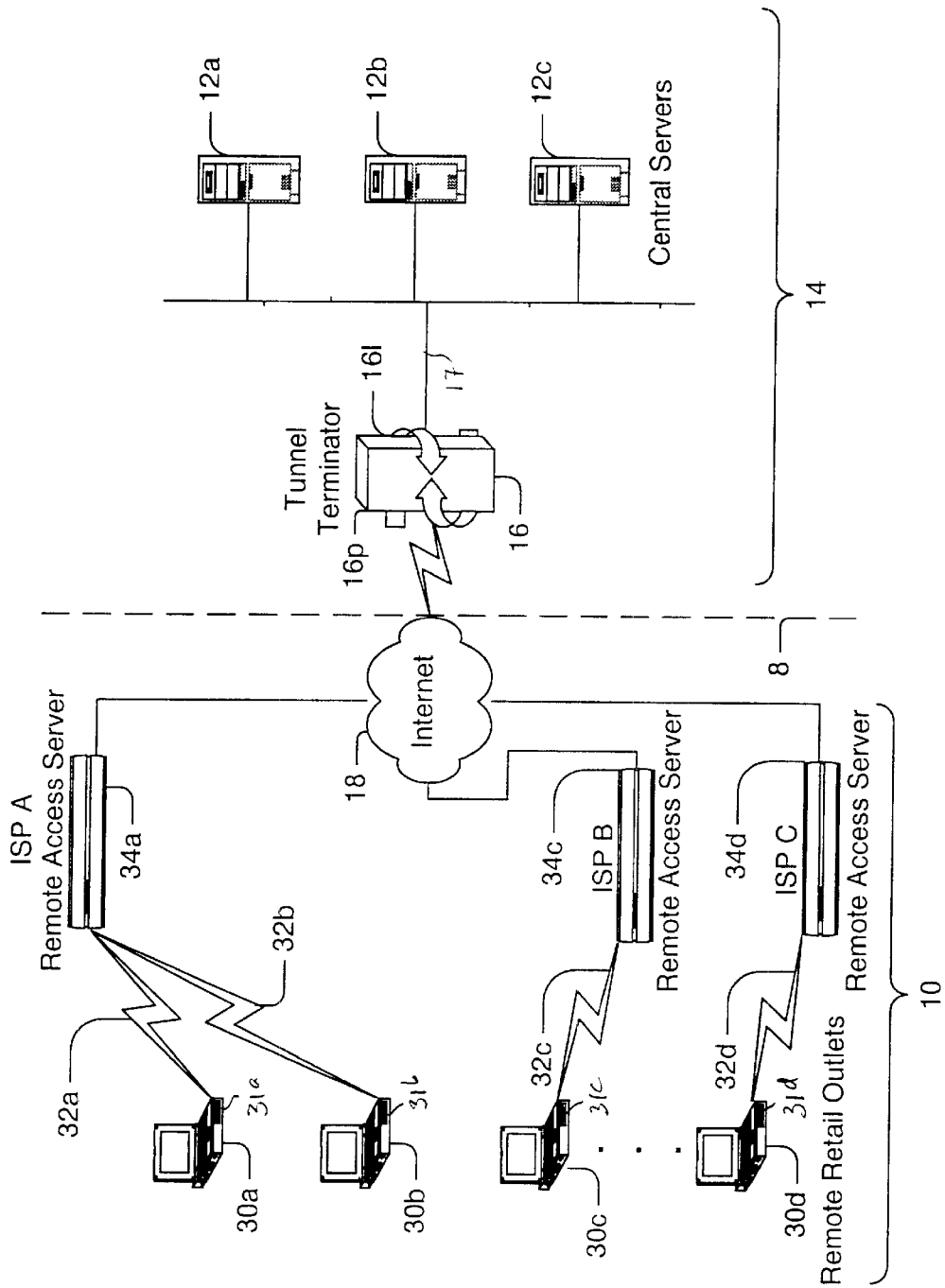
FIG. 1 is a simplified block diagram of a system for communicating by way of the internet between a first location and one or more host computers at one or more of a plurality of remote locations.

FIG. 1 is a simplified block diagram of a prior-art communication arrangement 10, in which a vendor has one or more servers 12a, 12b, . . . , 12c at a central location 14 on the right side of a dashed "division" line 8. Servers 12a, 12b, . . . , 12c are "tied" in a communications sense to a private or local port 16l of a tunnel terminator server or tunnel terminator 16. As illustrated in FIG. 1, tunnel terminator 16 also has a public port 16p, which is tied to the internet, represented as a cloud 18. The connection from public port 16p to the internet 18 is preferably by a wideband connection.

FIG. 1 also illustrates a set 30 of a plurality of host computers 30a, 30b, 30c, . . . , 30d, each of which represents a computer at a different retail vending site of the same vendor whose central location is designated 14. Each of the computers of set 30 includes a modem (not separately illustrated) which is connected by way of public switched telephone paths, illustrated as lightning bolts, to internet service providers (ISPs). For example, computer 30d is connected by a switched public telephone network line 32d to an ISP 34d, computer 30c is connected by a switched public telephone network line 32c to an ISP 34c, and computers 30a and 30b are connected by PSTN lines 32a and 32b, respectively, to an ISP server 34a. Ordinarily, the internet service providers will have public switched telephone network (PSTN) telephone numbers which are local to the retail sites. Each internet service provider 34a, 34c, and 34d provides connectivity to the internet 18. The various host computers may be equipped with arrangements for establishing virtual private network (VPN) secure connections to the tunnel terminator 16 by way of the ISP providers and internet 18.

While there may be many employees at any retail outlet such as those associated with host computers 30a, 30b, 30c, . . . , 30d, there may be only one person at the retail outlet who is familiar with the VPN connections and arrangements. In some cases, there may be only one such technically astute person available for all of the retail outlets in a region. Consequently, there may be no one at a given retail outlet who is familiar with the VPN system. When the connection between the retail outlet and the internet service provider is broken, or the secure "tunnel" VPN connection between the retail outlet and the central location is lost, the connection may remain broken for an extended period of time. During this period in which communications are unavailable, inventory control is not possible, and other services, such as credit-card operations, and the like, may likewise not be possible. Such disruptions may have a major impact on a vendor's operations.

According to an aspect of the invention, the "host" computer at each retail outlet, which provides the processing for the VPN connection, and which may also provide the processing for the inventory database and other checkout functions, is arranged for autonomously establishing and maintaining a persistent VPN connection with the vendor's central location. The host computer is provided with arrangements for autonomously establishing an ISP connection, for autonomously invoking the tunnel terminator at the vendor's central location, and autonomously monitors both the ISP connection and the VPN connection, and intervenes as necessary to reestablish a broken or lost connection. This creates a persistent secure path for the flow of the inventory and other information regardless of the presence or absence of a technically adept employee at the retail outlet.

Figure 2:
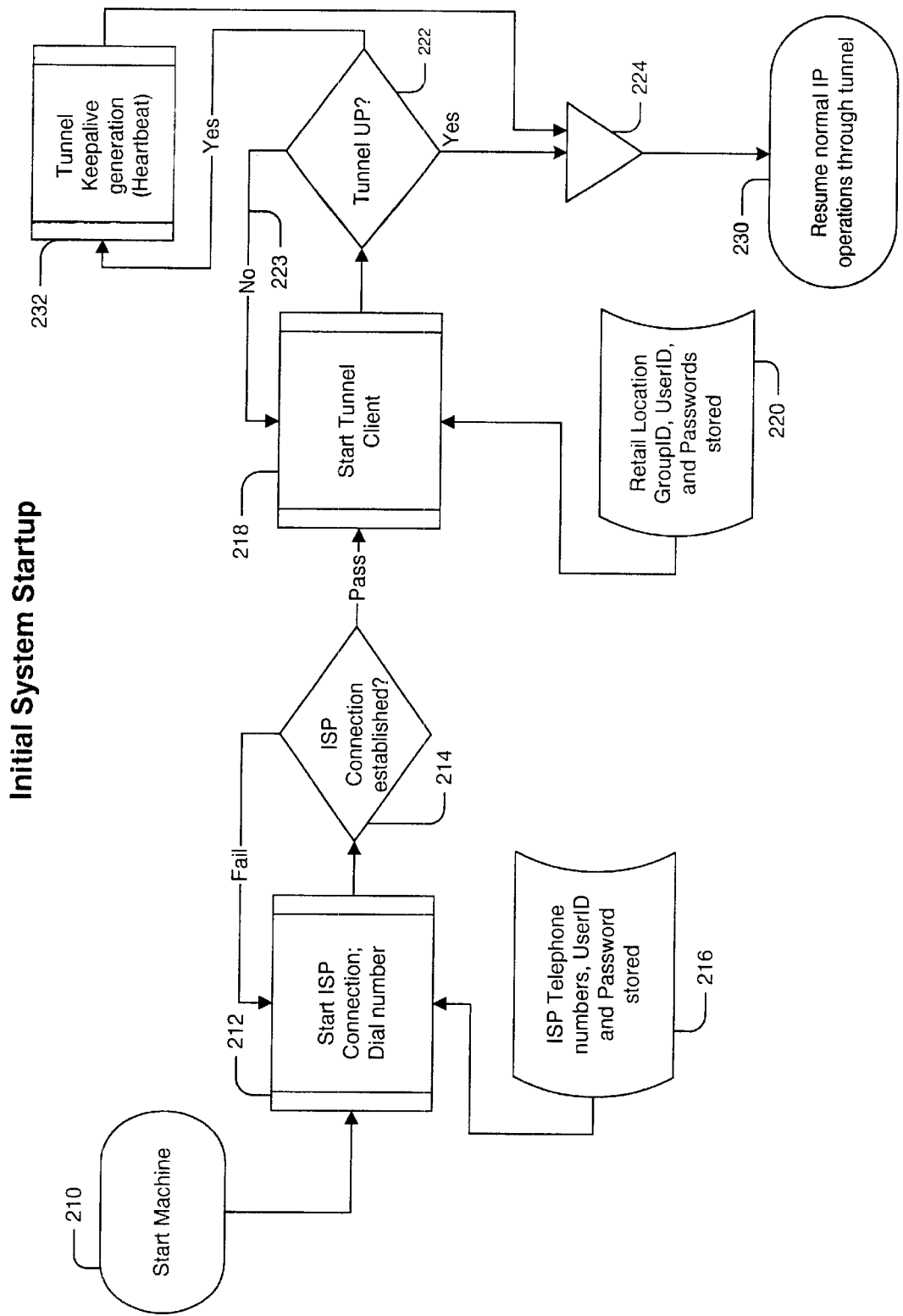
FIG. 2 is a simplified flow chart or diagram of processing performed at any one of the host computers of FIG. 1.

FIG. 2 is a simplified flow chart or diagram of processing performed at any one of the host computers of FIG. 1 for implementing the first of the abovementioned functions, namely the autonomous establishing of an internet service provider connection. In FIG. 2, the processing 200 starts at a block 210, which represents boot-up of the host computer. This boot-up need be done only once, at the time that the host computer is installed in the retail outlet. If the local power were to fail, boot-up will occur automatically. The logic flows from start-up block 210 to a predefined or preprogrammed logic block 212, which represents the initiation of the dialing function for the modem at the host computer, in order to begin to establish the ISP connection. Block 212 uses preprogrammed or stored information from block 216; such information may include one or more telephone numbers, user ID, and passwords which may be necessary to establish the ISP connection. From block 212, the logic flows to a decision block 214, which decides whether the internet connection is made. If not, the logic returns to block 212 to re-initiate dialing. Software to perform the functions of blocks 212 and 214 is readily available for all operating systems, and may include such features as dialing an alternate number if the principal number is not reached within a particular number of tries. Once the ISP connection is made, the logic leaves block 214 by the PASS output, and arrives at a block 218.

When the ISP connection is made, ISP-related information including dynamically assigned IP address and default gateway IP address are transferred to the host computer. It should be noted that the information stored on the host computer for facilitating the various connections is desirably encrypted, so that a person having unauthorized access to the host computer cannot extract usable information.

Block 218 of FIG. 2 represents starting or initialization of the predefined process for establishing the VPN tunnel, which is a secure communications path. Block 218 looks to memorized information in block 220, and uses the memorized information to aid in establishing the VPN tunnel. FIG. 5 is a simplified flow diagram illustrating details of block 218. Block 218 is invoked as many times as may be needed in order to establish the VPN tunnel, by a loop including a decision block 222 and a feedback path 223. When the VPN tunnel is established, the logic exits decision block 222 by the PASS output. At this step in the process, the VPN "shim" is in place between layers 2 and 3, which are the "data link layer" and the "network layer," respectively, of the Open Systems Interconnection (OSI) reference model, (promulgated by the International Standards Organization), so that the data moving from the host computer to the internet connection is encrypted. From the PASS output of decision block 222, the logic flows to a pass control block 224, which passes control to the operating system. From pass control block 224, the logic flows to a node 230, which represents normal operation of the VPN tunnel, by which the data to be transmitted and received passes in encrypted form.

Block 232 of FIG. 2 represents the generation of keep-alive or heartbeat signals, as known, which are exchanged between the host computer and the tunnel terminator to aid in verifying operation of the encrypted tunnel. These keep-alive signals are conveyed to the operating system by way of node 230.

Figure 3:
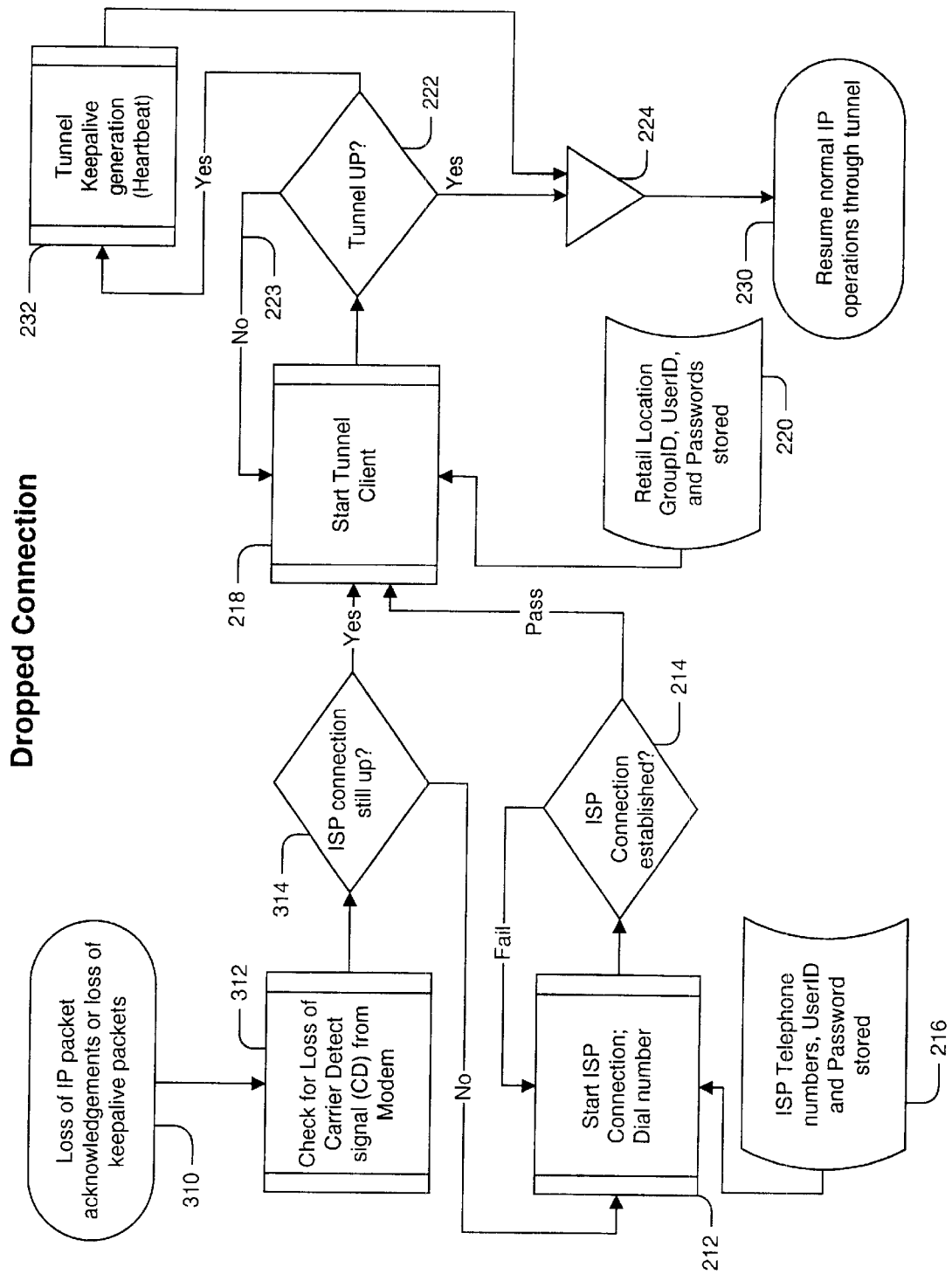
FIG. 3 is a simplified block diagram of an embodiment of that portion of an aspect of the invention which monitors a tunnel connection, and which restores the tunnel connection if lost.

FIG. 3 is a simplified block diagram of an embodiment of that portion of an aspect of the invention which monitors the tunnel connection, and which restores the tunnel connection if lost. In FIG. 3, elements corresponding to those of FIG. 2 are designated by like reference numerals. In FIG. 3, a block 310 represents monitoring of the tunnel connection. This may be accomplished in several ways. One way is to monitor the "heartbeat" signals from the tunnel terminator server at the other end of the connection, and to deem the tunnel connection as being lost in the absence of a particular number of heartbeats. Another way to establish a loss of tunnel connection is to monitor for the presence of acknowledgement packets in response to transmitted packets. Such acknowledgements are standard in the TCP/IP protocol suite. Once block 310 determines that the tunnel connection has been lost, the logic flows to a block 312, which determines the state of the modem and ISP connection. This is a well-known function, which can be performed by, for example, determining the presence of a carrier detect in an RS-232 connection. From block 312, the logic flows to a decision block 314, which routes the logic to block 212 to start the ISP connection logic if the ISP connection has been lost, and which routes the logic to block 218 to start the VPN connection procedure if the ISP connection is good, but the VPN connection has been lost. Thus, the monitoring and connection re-establishing procedure operates to maintain both the ISP and VPN connections, so that a persistent secure VPN connection is established.

Figure 4:
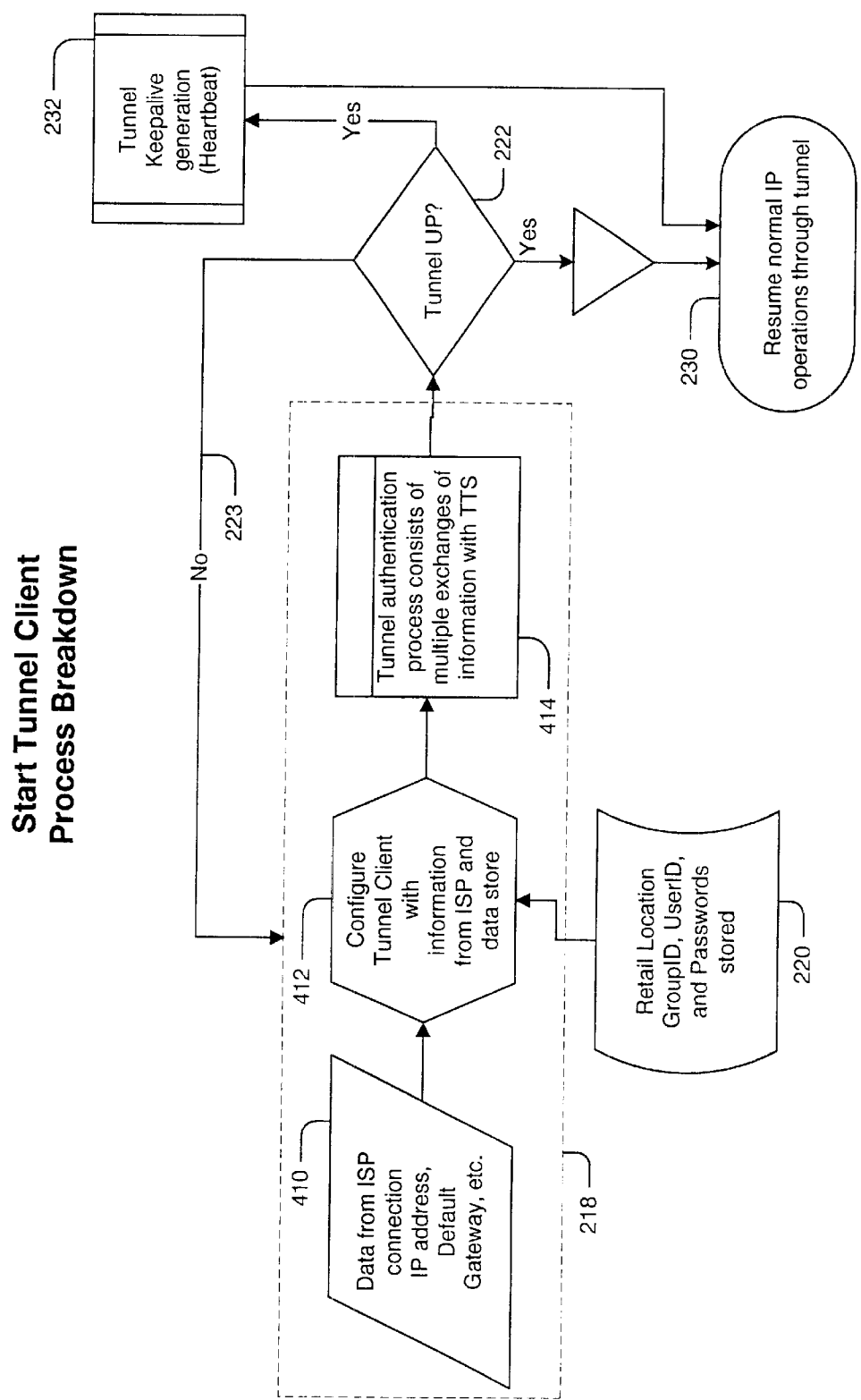
FIG. 4 is a simplified representation illustrating details of the arrangement of FIG. 2.

FIG. 4 is a simplified representation illustrating details of block 218 of FIG. 2. In FIG. 4, elements corresponding to those of FIG. 2 are designated by like reference numerals. In FIG. 4, block 218 is represented as including a block 410. Block 410 represents the acquisition of information arising from block 212 of FIG. 2 at the time that the ISP connection is established. The information which is acquired includes at least (a) the IP address dynamically (temporarily) assigned to the host computer by the ISP, (b) subnet mask information, which is a "mask" which is overlaid on the IP address to enable the host computer to distinguish between local and remote locations, and (c) default gateway address, which is the address to which the host computer forwards all host-computer-generated packets not destined for its local network. The information acquired in block 410 of FIG. 4 is made available to a block 412, which uses the acquired information, together with information from storage or memory block 220, to configure parameters of the tunnel client.

The configuration block 412 of FIG. 4 initially takes the tunnel terminator address, and places it into a memory, so that the system has an identifiable connection target. Then, it places a predefined group identification and password (or shared secret), which are derived from block 220, into a process cue in block 414. In block 414, the group identification and password are sent to the target tunnel terminator in unencrypted form. The tunnel terminator, for its part, performs its usual function, which is to respond with a dialog requesting specific user identification and password, for authentication. The return from the tunnel terminator to the client is in encrypted form, but the tunnel is not yet in place. The encrypted response from the tunnel terminator is coupled to block 414. Block 414 responds to the encrypted dialog request, by taking the next layer of data originating from block 412 and stored in block 220, and transmitting that data back to the tunnel terminator, using the same hash or encryption algorithm. The "next layer" of data includes the user identification and additional password. At this point, the tunnel terminator verifies or authenticates the encrypted user identification and password, and returns to block 414 a response including a private internet protocol (IP) address. The private IP address allows the host computer to address devices on the "tunnel terminator side" of the tunnel as though it were at that location. Having completed its portion of generation of the tunnel, block 414 transfers control to block 222 for retrying if the tunnel is not established, and for monitoring the existence of the tunnel during normal operation. A person of average skill in the art knows from this description how to program for the indicated functions.

An arrangement as described in conjunction with FIGS. 1 through 4 autonomously establishes and maintains a persistent, secure VPN tunnel, by establishing and maintaining a telephone connection to an ISP, and by way of the ISP with a particular designated tunnel terminator.

Other embodiments of the invention will be apparent to those skilled in the art. For example, instead of authentication by use of a static user ID and password, the tunnel terminator may refer to a Radius-protocol authentication server, an ACE Secure ID authentication server, which is provided by RSA whose address is 20 Crosby Drive, Bedford, Mass. 07130, a Public Key Infrastructure server using digitally signed certificates in accordance with X.509 standards, or any other authentication mechanism.

Thus, a system according to an aspect of the invention is for autonomously establishing, monitoring, and maintaining a secure and persistent internet (18) communication path between one or more interconnected computers (12*a*, 12*b*, . . . , 12*c*) located at a first "central" site (14) and at least one host computer (any one computer of set 30 of computers 30*a*, 30*b*, 30*c*, 30*d*) of a plurality of host computers at sites (10) remote from the first site (14). The system includes a tunnel terminator server (16) at the central site (14), operating pursuant to a secure tunneling protocol (IPSec, PPTP, and L2TP, or any other). The tunnel terminator server (16) includes a private port interface and a public port interface. The tunnel terminator server (16) initially establishes a clear communications link, by way of the public port interface (16p), with one or more of a plurality of clients calling from the internet (18), and initially identifies and authenticates each of the clients as being one of the "authorized" computers (30*a*, 30*b*, 30*c*, 30*d*) at one of the remote sites (10). For each client so identified and authenticated, the tunnel terminator server (16) establishes an encrypted communications link, and, when the encrypted communication link is established, provides a new private IP address to each individual client so identified and authenticated. The system also includes a connection (17) between the private port interface of the tunnel terminator server (16) and the one or more interconnected computers (12*a*, 12*b*, . . . , 12*c*). Each host computer(s) (30*a*, for example) at the remote site (10) includes a modem coupled to a public switched telephone system or PSTN (32*a*, 32*b*, 32*c*, 32*d*). Each host computer (30*a*, 30*b*, 30*c*, or 30*d*) further includes (a) an arrangement (212, 214, and 216) for, upon completion of boot-up of the host computer (30*a*, 30*b*, 30*c*, or 30*d*), autonomously causing the associated modem (31*a*, 31*b*, 31*c*, 31*d*) to dial an internet (18) service provider at one or more predetermined telephone numbers (stored in memory 216), to thereby initiate establishment of an ISP internet (18) connection to the host computer (30*a*, 30*b*, 30*c*, or 30*d*);

(b) an arrangement (218, 220, 222, and 223) for, upon successfully establishing the ISP internet (18) connection to the host computer (30*a*, 30*b*, 30*c*, or 30*d*), autonomously invoking the tunnel terminator server (16) to thereby begin a dialogue therewith by way of the internet (18), and for interacting with the tunnel terminator server (16) to establish a secure communications link between the host computer (30*a*, 30*b*, 30*c*, or 30*d*) and the tunnel terminator server (16); and (c) an arrangement (232, 310, 312, 314) for, upon establishing the secure communications link between the host computer (30a, 30b, 30c, or 30d) and the tunnel terminator server (16), autonomously monitoring (310) the state of both the ISP internet (18) connection and the secure communications link, and for, if one of the ISP internet (18) connection and the secure communications link is lost, autonomously reestablishing the lost one of the ISP internet (18) connection and the secure communications link, so that the ISP internet (18) connection and the secure communications link are persistent.

This system thereby establishes and maintains a secure internet (18) data path between the host computer (30a, 30b, 30c, or 30d) and the tunnel terminator server (16) without intervention by an operator.

A host computer (30a, 30b, 30c, or 30d) according to another aspect of the invention includes a modem (31a, 31b, 31c, and 31d) coupled to a public switched telephone system (32am 32bm 32cm abd 32d). The host computer (30a, 30b, 30c, or 30d) is for use in a system for autonomously establishing, monitoring, and maintaining a secure and persistent internet (18) communication path between one or more interconnected computers (12a, 12b, ..., 12c) located at a first site (14) and at least one host computer (30a, 30b, 30c, or 30d), out of a plurality of host computer (30a, 30b, 30c, or 30d)s, at sites (such as 10) remote from the first site (14). The system includes (a) a tunnel terminator server (16) operating pursuant to a secure tunneling protocol (IPSec, PPTP, and L2TP). The tunnel terminator server (16) includes a private port interface (161) and a public port interface (16p). The tunnel terminator server (16) initially establishes a clear communications link, by way of the public port interface (16p), with one or more of a plurality of clients calling from the internet (18), and initially identifies and authenticates each of the clients as being "authorized," or as being one of the computers (30a, 30b, 30c, 30d) at one of the remote sites (10). For each client so identified and authenticated, the tunnel terminator server (16) establishes an encrypted communications link, and, when the encrypted communication link is established, provides a new private IP address to each individual client so identified and authenticated. The system also includes (b) a connection (17) between the private port interface of the tunnel terminator server (16) and the one or more interconnected computers (12a, 12b, ..., 12c). Each of the host computer(s) (30a, 30b, 30c, or 30d) includes (i) an arrangement (212, 214, 216) for, upon completion of boot-up of the host computer (30a, 30b, 30c, or 30d), autonomously causing the associated modem (31a, 31b, 31c, 31d) to dial an internet (18) service provider (ISP 34a, 34c, 34d) at one or more predetermined telephone numbers (stored in 216), to thereby initiate establishment of an ISP internet (18) connection to the host computer (30a, 30b, 30c, or 30d), (ii) an arrangement for, upon successfully establishing the ISP internet (18) connection to the host computer (30a, 30b, 30c, or 30d), autonomously (a) invoking the tunnel terminator server (16), to thereby begin a dialogue therewith by way of the internet (18), and (b) for interacting with the tunnel terminator server (16) to establish a secure communications link between the host computer (30a, 30b, 30c, or 30d) and the tunnel terminator server (16), (iii) an arrangement for, upon establishing the secure communications link between the host computer (30a, 30b, 30c, or 30d) and the tunnel terminator server (16), (a) autonomously monitoring the state of both the ISP internet (18) connection and the secure communications link, and (b), if one of the ISP internet (18) connection and the secure communications link is lost, autonomously reestablishing the lost one of the ISP internet (18) connection and the secure communications link, so that the ISP internet (18) connection and the secure communications link are persistent.

According to a yet further aspect of the invention, a method is provided for autonomously establishing, monitoring, and maintaining a secure virtual private network tunnel between a first site and each of a plurality of host computer (30a, 30b, 30c, or 30d)s at sites remote from the first site, where each of the host computer (30a, 30b, 30c, or 30d)s includes a modem coupled to a public switched telephone system, in a system which includes a tunnel terminator server (16). The tunnel terminator server (16) according to this aspect of the invention operates pursuant to a secure tunneling protocol. The tunnel terminator server (16) includes a private port interface and a public port interface. The tunnel terminator server (16) initially establishes a clear communications link, by way of the public port interface, with one or more of a plurality of clients calling from the internet (18), and initially identifies and authenticates each of the clients as being one of the computers at one of the remote site (10)s. For each client so identified and authenticated, the tunnel terminator server (16) establishes an encrypted communications link, and, when the encrypted communication link is established, provides a new private IP address to each individual client so identified and authenticated. The system also includes a connection between the private port interface of the tunnel terminator server (16) and the one or more interconnected computers (12a, 12b, ..., 12c). The method comprises the steps, at each host computer (30a, 30b, 30c, or 30d), of booting the host computer (30a, 30b, 30c, or 30d). Upon completion of booting of the host computer (30a, 30b, 30c, or 30d), it autonomously (a) causes the associated modem to dial an internet (18) service provider at one or more predetermined telephone numbers, and (b) initiates establishment of an ISP internet (18) connection to the host computer (30a, 30b, 30c, or 30d). Upon successfully establishing the ISP internet (18) connection, the host computer (30a, 30b, 30c, or 30d) autonomously (a) invokes the tunnel terminator server (16) to thereby begin a dialogue therewith by way of the internet (18), and (b) interacts with the tunnel terminator server (16) to establish a secure communications link between the host computer (30a, 30b, 30c, or 30d) and the tunnel terminator server (16). The method further includes the step of, upon establishing the secure communications link between the host computer (30a, 30b, 30c, or 30d) and the tunnel terminator server (16), autonomously monitoring, at the host computer (30a, 30b, 30c, or 30d), the state of both the ISP internet (18) connection and the secure communications link. If the step of autonomously monitoring indicates that the ISP internet (18) connection communications link is lost, the host computer (30a, 30b, 30c, or 30d) autonomously reestablishes the ISP internet (18) connection and the secure communications link, and if the secure communications link is lost, the host computer (30a, 30b, 30c, or 30d) autonomously reestablishes the secure communications link. As a result, the ISP internet (18) connection and the secure communications link are persistent.

What is claimed is:

1. A system for autonomously establishing, monitoring, and maintaining a secure and persistent internet communication path between one or more interconnected computers located at a first site and at least one host computer of a plurality of host computers at sites remote from said first site, said system comprising:

a tunnel terminator server operating pursuant to a secure tunneling protocol, said tunnel terminator server including a private port interface and a public port interface, for initially establishing a clear communications link, by way of said public port interface, with one or more of a plurality of clients calling from the internet, and for initially identifying and authenticating each of said clients as being one of said computers at one of said remote sites, and, for each client so identified and authenticated, establishing an encrypted communications link, and for, when said encrypted communication link is established, providing a new private IP address to each individual client so identified and authenticated;

a connection between said private port interface of said tunnel terminator and said one or more interconnected computers;

each said host computer including a modem coupled to a public switched telephone system, each said host computer further including;
  (a) an arrangement for, upon completion of boot-up of said host computer, autonomously causing the associated modem to dial an internet service provider at one or more predetermined telephone numbers, to thereby initiate establishment of an ISP internet connection to said host computer;
  (b) an arrangement for, upon successfully establishing said ISP internet connection to said host computer, invoking the tunnel terminator server to thereby begin a dialogue therewith by way of said internet, and for interacting with said tunnel terminator to establish a secure communications link between said host computer and said tunnel terminator;
  (c) an arrangement for, upon establishing said secure communications link between said host computer and said tunnel terminator, monitoring the state of both said ISP internet connection and said secure communications link, and for, if one of said ISP internet connection and said secure communications link is lost, autonomously reestablishing the lost one of said ISP internet connection and said secure communications link, so that said ISP internet connection and said secure communications link are persistent, thereby establishing and maintaining a secure internet data path between said host computer and said tunnel terminator server without intervention by an operator.

2. A host computer including a modem coupled to a public switched telephone system, said host computer being for use in a system for autonomously establishing, monitoring, and maintaining a secure and persistent internet communication path between one or more interconnected computers located at a first site and at least one host computer of a plurality of host computers at sites remote from said first site, said system including;
  (a) a tunnel terminator server operating pursuant to a secure tunneling protocol, said tunnel terminator server including a private port interface and a public port interface, for initially establishing a clear communications link, by way of said public port interface, with one or more of a plurality of clients calling from the internet, and for initially identifying and authenticating each of said clients as being one of said computers at one of said remote sites, and, for each client so identified and authenticated, establishing an encrypted communications link, and for, when said encrypted communication link is established, providing a new private IP address to each individual client so identified and authenticated; and
  (b) a connection between said private port interface of said tunnel terminator and said one or more interconnected computers,
  each said host computer comprising:
    an arrangement for, upon completion of boot-up of said host computer, autonomously causing the associated modem to dial an internet service provider at one or more predetermined telephone numbers, to thereby initiate establishment of an ISP internet connection to said host computer;
    an arrangement for, upon successfully establishing said ISP internet connection to said host computer, invoking the tunnel terminator server to thereby begin a dialogue therewith by way of said internet, and for interacting with said tunnel terminator to establish a secure communications link between said host computer and said tunnel terminator;
    an arrangement for, upon establishing said secure communications link between said host computer and said tunnel terminator, monitoring the state of both said ISP internet connection and said secure communications link, and for, if one of said ISP internet connection and said secure communications link is lost, autonomously reestablishing the lost one of said ISP internet connection and said secure communications link, so that said ISP internet connection and said secure communications link are persistent.

3. A method for autonomously establishing, monitoring, and maintaining a secure virtual private network tunnel between a first site and each of a plurality of host computers at sites remote from said first site, where each of said host computers includes a modem coupled to a public switched telephone system, in a system including:
  (a) a tunnel terminator server operating pursuant to a secure tunneling protocol, said tunnel terminator server including a private port interface and a public port interface, for initially establishing a clear communications link, by way of said public port interface, with one or more of a plurality of clients calling from the internet, and for initially identifying and authenticating each of said clients as being one of said computers at one of said remote sites, and, for each client so identified and authenticated, establishing an encrypted communications link, and for, when said encrypted communication link is established, providing a new private IP address to each individual client so identified and authenticated; and
  (b) a connection between said private port interface of said tunnel terminator and said one or more interconnected computers,
  said method comprising the steps, at each said host computer, of:
    booting said host computer;
    upon completion of booting of said host computer, autonomously (a) causing the associated modem to dial an internet service provider at one or more predetermined telephone numbers, and (b) initiating establishment of an ISP internet connection to said host computer;
    upon successfully establishing said ISP internet connection to said host computer, autonomously (a) invoking the tunnel terminator server to thereby begin a dialogue therewith by way of said internet, and (b) interacting with said tunnel terminator to establish a secure communications link between said host computer and said tunnel terminator; and upon establishing said secure communications link between said host computer and said tunnel terminator, autonomously monitoring the state of both said ISP internet connection and said secure communications link;

if said step of autonomously monitoring indicates that said ISP internet connection communications link is lost, autonomously reestablishing said ISP internet connection and said secure communications link; and if said secure communications link is lost, autonomously reestablishing said secure communications link, whereby said ISP internet connection and said secure communications link are persistent.

* * * * *